J. MORTON.
FENCE.
No. 185,449.
Patented Dec. 19, 1876.
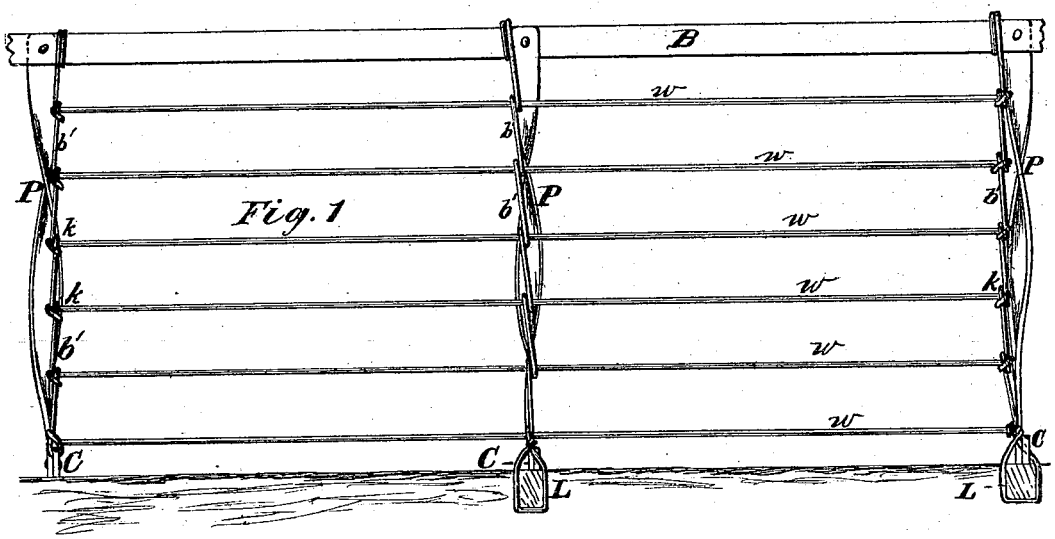
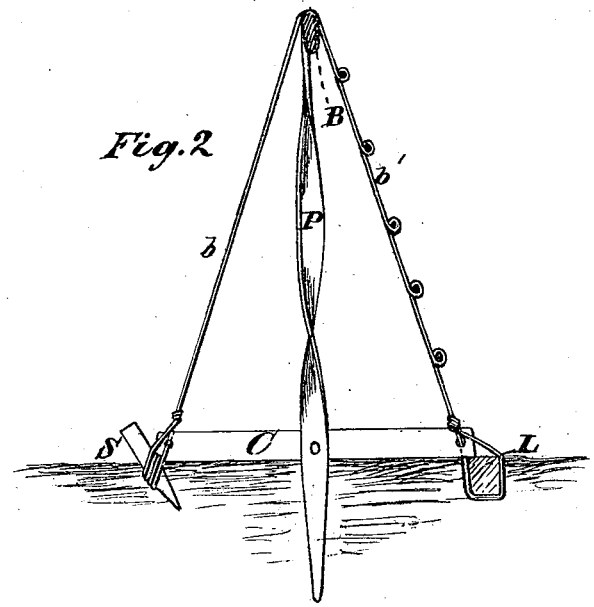
Witnesses:
Michael Ryan.
Thos Haynes
John Morton
by his Attorneys
Brown & Allen
THE GRAPHIC CO. N.Y.

UNITED STATES PATENT OFFICE.

JOHN MORTON, OF THORNVILLE, MICHIGAN.

IMPROVEMENT IN FENCES.

Specification forming part of Letters Patent No. 185,449, dated December 19, 1876; application filed April 27, 1876.

*To all whom it may concern:*

Be it known that I, JOHN MORTON, of Thornville, in the county of Lapeer and the State of Michigan, have invented an Improvement in Fences; and I hereby declare that the following is a full, clear, and exact description of the same, reference being had to the accompanying drawing, which forms a part of this specification.

My invention has for its object the construction of a fence which can be easily removed from place to place, which will not take fire and burn from fires on prairies, or when placed contiguous to railways, and which will form a protection for growing hedges.

The invention consists in a peculiarly-constructed fence, made principally of metal, and calculated to secure the objects above set forth.

Figure 1 in the drawing is a side view of my improved fence; and Fig. 2 is a detail view of a portion of the same.

P represents the posts, made of band-iron, twisted to give rigidity to the same. To the tops of said posts is riveted, bolted, or otherwise fastened the bar B. The bar B, in many situations, may be of wood, the rest of the fence being of metal, the position of said bar above the ground, and its isolation from other combustible materials, rendering a fence so constructed sufficiently fire-proof for use along lines of railways; but for prairies, where the fires sometimes sweep furiously, though briefly, over the ground, it will be better to make said bar of metal.

To the bottom of each post is fastened a cross-bar or support, C, also of band-iron; and from the extremities of each bar C, or to as many of them as may be necessary to give the requisite rigidity to the fence, extend wire braces $b\ b'$ obliquely to the tops of the posts P, said braces being preferably wound about the bar B close to the posts P, and attached by loops to the extremities of the cross-bars. Through loops in the braces $b'$ are run longitudinal wires $w$, stretched, and extending indefinitely along the fence, and knotted at intervals with, or looped around, the braces $b'$, as shown at $k$.

The posts P may be pointed at their lower ends and driven into the ground, to assist in supporting the fence; and the wire braces may have loops or extensions formed on them, and driven or embedded in the earth; or they may be either wound about a brick or a stone embedded in the earth, as shown at L, or a stake driven into the earth, as shown at S.

I claim—

The fence composed of the posts P, the bar B, fastened to the tops of said posts, the cross-bar supports C, fastened to the bottom of said posts, the oblique braces $b\ b'$, and the longitudinal wires interlooped with, and attached to, the braces $b'$, substantially as described.

JOHN MORTON.

Witnesses:
JOHN RATTRAY,
C. R. FERGUSON.